(12) United States Patent
Schwamborn (10) Patent No.: US 12,237,945 B2
(45) Date of Patent: Feb. 25, 2025

(54) METHOD, SYSTEM, AND GATEWAY FOR LINKING TIME- SENSITIVE FIELDBUSES

(71) Applicant: WAGO Verwaltungsgesellschaft mbH, Minden (DE)

(72) Inventor: Fabian Schwamborn, Lemgo (DE)

(73) Assignee: Wago Verwaltungsgesellschaft MBH, Minden (DE)

( * ) Notice: Subject to any disclaimer, the term of this patent is extended or adjusted under 35 U.S.C. 154(b) by 383 days.

(21) Appl. No.: 17/748,936

(22) Filed: May 19, 2022

(65) Prior Publication Data

US 2022/0278873 A1  Sep. 1, 2022

Related U.S. Application Data

(63) Continuation of application No. PCT/EP2020/082958, filed on Nov. 20, 2020.

(30) Foreign Application Priority Data

Nov. 20, 2019 (DE) ............... 10 2019 217 906.1

(51) Int. Cl.
*H04L 12/403* (2006.01)
*H04L 7/00* (2006.01)
*H04L 12/66* (2006.01)

(52) U.S. Cl.
CPC ........ *H04L 12/4035* (2013.01); *H04L 7/0008* (2013.01); *H04L 12/66* (2013.01)

(58) Field of Classification Search
CPC ... H04L 12/4035; H04L 7/0008; H04L 12/66; H04L 2012/4026
See application file for complete search history.

(56) References Cited

U.S. PATENT DOCUMENTS

| 7,508,824 B2 | 3/2009 | Kasper et al. |
| 7,668,182 B2 | 2/2010 | Hetzel et al. |
| 8,321,612 B2 | 11/2012 | Hartwich et al. |

(Continued)

FOREIGN PATENT DOCUMENTS

| CN | 101164264 A | 4/2008 |
| DE | 102 20 334 A1 | 11/2003 |

(Continued)

*Primary Examiner* — Benjamin Lamont
(74) *Attorney, Agent, or Firm* — Muncy, Geissler, Olds & Lowe, P.C.

(57) ABSTRACT

A method for networking a first time-sensitive field bus with a second time-sensitive field bus, the first time-sensitive field bus comprising a first subscriber device and having a first dedicated time domain, and the second time-sensitive field bus comprising a second subscriber device and having a second dedicated time domain. The first time domain and the second time domain being frequency-synchronized. The first and second field buses being connected to each other via a gateway. The method includes: storing a first subscriber device identifier in the memory of the gateway; storing a second subscriber device identifier in the memory of the gateway; determining a first cycle duration of the first field bus and a second cycle duration of the second field bus by the gateway at a reference time; and determining a time offset between the first and second time domain by the gateway at the reference time.

17 Claims, 5 Drawing Sheets

(56) References Cited

U.S. PATENT DOCUMENTS

| | | | |
|---|---|---|---|
| 9,756,590 B2 | 9/2017 | Koenigseder et al. | |
| 2002/0062417 A1* | 5/2002 | Rudland | H04L 61/4541 |
| | | | 710/306 |
| 2004/0022256 A1* | 2/2004 | Green | H04L 61/106 |
| | | | 370/401 |
| 2005/0169262 A1* | 8/2005 | Kasper | H04L 12/66 |
| | | | 370/389 |
| 2005/0237928 A1* | 10/2005 | Le Scolan | H04L 12/40091 |
| | | | 370/223 |
| 2006/0045135 A1* | 3/2006 | Hetzel | H04L 12/40091 |
| | | | 370/503 |
| 2009/0279651 A1* | 11/2009 | Ungermann | H04J 3/0652 |
| | | | 375/356 |
| 2010/0049891 A1* | 2/2010 | Hartwich | H04J 3/0655 |
| | | | 710/110 |
| 2016/0080533 A1* | 3/2016 | Jeon | H04L 12/66 |
| | | | 370/402 |
| 2020/0076494 A1* | 3/2020 | Shindou | G06Q 20/0855 |
| 2021/0091919 A1* | 3/2021 | Geng | H04L 7/0008 |

FOREIGN PATENT DOCUMENTS

| | | |
|---|---|---|
| DE | 10 2004 009 889 A1 | 9/2004 |
| DE | 10 2012 204 586 A1 | 10/2013 |
| DE | 10 2015 212 561 A1 | 1/2017 |

\* cited by examiner

METHOD, SYSTEM, AND GATEWAY FOR LINKING TIME- SENSITIVE FIELDBUSES

This nonprovisional application is a continuation of International Application No. PCT/EP2020/082958, which was filed on Nov. 20, 2020, and which claims priority to German Patent Application No. 10 2019 217 906.1, which was filed in Germany on Nov. 20, 2019, and which are both herein incorporated by reference.

BACKGROUND OF THE INVENTION

Field of the Invention

The present invention relates to time-sensitive field bus systems, in particular industrial field bus systems for controlling industrial systems. In particular, the invention relates to a method, a system and a gateway for networking at least two time-sensitive field buses.

Description of the Background Art

Field buses are used to interconnect different subscriber devices (e.g., field devices such as sensors, actuators, detectors, control elements, etc., as well as controllers, such as control or automation devices, programmable logic controllers (PLCs), etc.) in a plant (e.g., an industrial manufacturing facility, vehicle, building, etc.) for the purpose of communication. However, the communication does not take place, in particular, exclusively between different field devices and a field bus controller, which controls and monitors the processes running in the plant. A subscriber device may be a field device or a controller and has, in particular, an interface to the field bus.

The messages to be transmitted via a field bus (e.g., data blocks, data streams) are at least partially time-sensitive, i.e., they have real-time requirements with regard to the transmission latency. For example, it is necessary for time-sensitive data of this type that a message sent by a subscriber device is reliably received by the field bus controller or another field device connected to the field bus within a predictable period of time.

The data to be transmitted between subscriber devices of the field bus comprise not only value communication, such as measured values, manipulated variables or instructions, but also event communication for the temporal coordination of machines and plant parts. For example, the coordination and synchronization of movements of machine parts increasingly no longer take place via mechanical apparatuses (e.g., metal presses having mechanically rigidly coupled feeding and ejecting apparatuses in the machine cycle, camshafts, gears, etc.), but rather via digital messages, which are transmitted with real-time requirements via field buses.

A field bus is assigned to a time domain, in which all subscriber devices each have a timer (e.g., a clock). The timers of the subscriber devices are synchronized with each other within the time domain and thus have a common understanding of time. All subscriber devices of a field bus may thus follow a defined field bus communication cycle and are coordinated with each other to carry out the corresponding actions at the right point in time. One subscriber device of the field bus acts as a master for the time domain, the timer of the master supplying the time reference for the other subscriber devices of the time domain. The latter subscriber devices, which derive their time from the master within the time domain, are also referred to as slaves. The role of the time master in the field bus may be taken on by a field bus controller, however also by another subscriber device connected to the field bus. The time master of the field bus may synchronize its time base with another time base, for example with the time master of another field bus or with a hierarchically superordinate time base. In that the masters of multiple field buses synchronize their particular field bus time with each other, a time domain may also comprise multiple field buses. The "clocks" are aligned by the synchronization of the time base. However, this does not necessarily mean that two field buses within one time domain have the same communication cycles.

A first generation of field buses was developed to replace the cabling complexity due to the parallel wiring of machine parts, which used to be common practice, via cable assemblies, with digital transmission technology. Multiple, in part proprietary, field bus protocols were developed for this purpose. Later generations of field buses are based primarily on the Ethernet standard IEEE 802.3, the Ethernet protocols having been modified or expanded to implement time-sensitive networks (TSNs).

Standards for real-time Ethernet protocols are developed, for example, by the IEEE 802.1Q task group, for TSN networks. A real-time-supporting (time-aware) scheduler is defined, for example, by the IEEE802.1QBV standard. The scheduler makes it possible to divide the communication in a network into fixed, periodically repeating communication cycles and to define, reserve or negotiate fixed time slots for transmitting time-sensitive data within the cycles. A clocked end-to-end transmission between two subscriber devices may be implemented hereby.

Non-time-sensitive data (best effort data) may be transmitted outside the time slots provided for real-time transmission, the known protocols for a packet-switched transmission (e.g., Ethernet protocol) being used for this purpose. Guard bands may be configured by the time-aware scheduler to prevent an overlapping of transmissions of non-time-sensitive data packets with the time slots reserved for real-time transmissions.

In TSN networks, it is furthermore possible to interrupt and subsequently resume the transmission of non-time-sensitive data packets during the real-time intervals. The coexistence of time-sensitive and non-time-sensitive communication is made possible in this way in a TSN-capable network.

During the course of the increasing digital transformation and networking of plants (e.g., of an entire production facility), it is necessary to facilitate the communication between field buses as well as the communication between a field bus and equipment of a higher control level, process control level, operating control level and/or company level. The networking relates to both non-time-sensitive data and time-sensitive data.

Although most real-time protocols for field buses in use today are based on Ethernet, technical differences do exist despite this commonality, so that different field bus types are incompatible or not completely compatible with each other. In addition, different generations of field buses may be used, for example when parts of a plant are added, replaced or modernized, field buses of different generations not necessarily being fully compatible. At present, efforts are being made to specify universally usable real-time protocols, which are expected to replace the many proprietary and incompatible protocols for time-sensitive field buses. However, their use requires existing field bus system to be replaced or retrofitted, which is often not economically justifiable.

Known approaches for time-sensitive communication between two or multiple field buses assume that all field buses to be coupled have a uniform understanding of time, all time offsets as well as durations and/or start times of the field bus communication cycles, however, being synchronized. However, field buses are often configured in complex ways at the start of manufacturing, so that the machines controlled by the field bus and/or plant parts are optimally coordinated with each other. An alignment of the cycle times of an existing field bus to newly added plant parts having further field buses would, however make it necessary to reconfigure the existing processes controlled by the field bus.

A need therefore exists to interconnect time-sensitive field buses, which are not completely compatible with each other.

SUMMARY OF THE INVENTION

It is therefore an object of the present invention to provide a method for networking a first time-sensitive field bus with a second time-sensitive field bus, a system for networking at least two time-sensitive field buses, and a gateway for the purpose of time synchronization and for networking at least two time-sensitive field buses.

To achieve the object, in particular, a gateway is used, which mediates the communication between time-sensitive field buses. Since the gateway supports the particular time domain of all field buses connected thereto, the field buses may communicate with each other largely without aligning the time domains and, in particular, the times of the communication cycles defined within the field buses. This applies to time-sensitive data as well as to non-time-sensitive data.

An aspect of the present invention relates to a method for networking a first time-sensitive field bus with a second time-sensitive field bus, the first time-sensitive field bus comprising a first subscriber device and having a first dedicated time domain. The second time-sensitive field bus comprises a second subscriber device and has a second dedicated time domain. The first time domain and the second time domain are frequency-synchronized. The first and second field buses are connected to each other with the aid of a gateway. The method comprises a storage of a first subscriber device identifier in the memory of the gateway, the first subscriber device identifier identifying a virtual copy of the assigned first subscriber device of the first field bus. The method also comprises a storage of a second subscriber device identifier in the memory of the gateway, the second subscriber device identifier identifying a virtual copy of the assigned second subscriber device of the second field bus. The method furthermore comprises a determination of a first cycle duration of the first field bus and a second cycle duration of the second field bus by the gateway at a reference time, as well as a determination of a time offset between the first time domain and the second time domain by the gateway at the reference time.

The frequency synchronization may take place by a synchronization of the clock frequencies in the time domains of the first and second field buses. Due to a frequency synchronization of this type, the first and second field buses or the first and second time domains may have differently defined times, however the time offset is time-invariant, i.e., constant over time. Due to a synchronization only of the frequencies in the first and second time domains, the time regime (i.e., the valid time of a time domain) in the field buses may remain largely unaffected. In particular, a hard time jump is avoided, which could otherwise occur in one or in both field buses when aligning the first and second field bus times. The alignment of the frequencies may take place over a time period which does not impair the operation of the processes running in the field buses.

The first and second field buses may be connected via the gateway in such a way that the gateway is connected in each case to the first or second field bus as a subscriber device. A network connection having a corresponding interface to the particular field bus may be provided for this purpose. The gateway may provide virtual copies of subscriber devices for the communication of a field bus to one or multiple subscriber devices of another field bus. The virtual copies of the subscriber devices of the other field buses may be configured as subscriber devices of the local field bus. For example, the virtual copy of the first subscriber device in the first field bus may be configured as a subscriber device in the second field bus, and the virtual copy of the second subscriber device in the second field bus may be configured as a subscriber device in the first field bus.

The virtual copies may each be identified with the aid of subscriber device identifiers. For example, the first subscriber device in the first field bus may send a message to the virtual copy of the second subscriber device, using the subscriber device identifier of the virtual copy of the second subscriber device. In embodiments of the invention, the subscriber device identifier may be designed as a network address, for example as a Medium Access Control (MAC) address or as an Internet Protocol (IP) address or as an address of another network protocol or as an address or identifier in a network protocol layer. The gateway may also be configured to forward received messages to the assigned subscriber device via a virtual copy of a subscriber device. For this purpose, it may use, for example, an identifier of the assigned subscriber device. The gateway may furthermore receive reply messages of the assigned subscriber device via a virtual copy and forward them to the subscriber device in the other field bus.

Due to the fact that the gateway carries out the first cycle duration of the first field bus and the second cycle duration of the second field bus at a reference time as well as the determination of a time offset between the first time domain and the second time domain at the reference time, the gateway may act as a mediator or "translator" between the time regimes of the field buses.

For example, the gateway may receive a message from a subscriber device in the second field bus via the virtual copy of the first subscriber device. The message may be, for example, non-time-sensitive data (so-called best-effort data), which are to be sent from the subscriber device in the second field bus to the first subscriber device in the first field bus. Since the virtual copy of the first subscriber device behaves like a subscriber device in the second field bus, it may take into account the cycle duration of the second field bus when receiving the message. In addition, time slots for transmitting time-sensitive data may be reserved in the second field bus. These reserved time slots may be taken into account in such a way that the non-time-sensitive data are received outside these time slots. The gateway may now forward the message, taking into account the cycle duration of the first field bus and taking into account reserved time slots for transmitting time-sensitive data in the first field bus. For the purpose of forwarding outside the reserved time slots in the first field bus, it is also possible that the gateway carries out a buffering of the non-time-sensitive data.

The first subscriber devices in the first field bus may send a reply to the received message to the subscriber device in the second field bus in the reverse direction via the assigned virtual copy in the gateway. The cycle durations and the reserved time slots in the first and second field buses are again taken into account, possibly by buffering the data. An exchange of this type may be sensible if measured values, control commands as well as software updates or other operating data are to be transmitted in a non-time-critical manner between field buses having different time domains. However, data for configuration, for example, for reserving corresponding time slots across field buses for transmitting time-sensitive data may also be transmitted as non-time-sensitive communication. The virtual copy of a subscriber device assigned to a subscriber device in one field bus forms a termination point for communication protocols in the other field bus and behaves toward the subscriber devices in the other field bus like a subscriber device in that other field bus.

The gateway may also support the transfer of time-sensitive data with the aid of the virtual copies of at least one portion of the subscriber devices of a field bus. For this purpose, the gateway may determine a time overlap of a first time slot set by the first field bus for communicating time-sensitive data in the first field bus and a second time slot set by the second field bus for communicating time-sensitive data in the second field bus. The determination may take place with the aid of corresponding queries to subscriber devices of the first or second field bus, or also by the fact that the gateway mediates the negotiation of time slots of thus type and stores the mediated time slots and further communication parameters.

The method also comprises the steps of a receiving, by the gateway, of a request of the second field bus of a time slot to transmit time-sensitive data from the first subscriber device of the first field bus to the second subscriber device of the second field bus. The method may also comprise a forwarding of the request to the first field bus. In addition, the gateway may receive a confirmation message from the first field bus and forward this confirmation message to the second field bus.

The request may originate in an arbitrary subscriber device of the second field bus and be directed to another subscriber device in the first field bus.

For example, a subscriber device having a scheduler function in the second field bus may send a request to the first field bus. In the first and second field buses, at least one scheduler in each case may be responsible for defining the transmission cycles and/or for assigning, negotiating, allocating, configuring and/or managing the time slots for transmitting time-sensitive data. Subscriber devices of this type may be designed as time-aware schedulers and execute the corresponding protocols and functions for this purpose, e.g., according to the IEEE 802.1Q or 802.1Qbv standard. The request may be directed to a subscriber device of the first field bus having the function of a time-aware scheduler, which is able to negotiate and assign time slots for communicating time-sensitive data for the first subscriber device in the first field bus. Since the gateway is also a subscriber device of the first field bus, embodiments of this type may be that the function as a time-aware scheduler for the first field bus may also be taken on by the gateway. In this case, the communication with the first field bust may take place internally in the gateway. Similarly, the gateway may also be a subscriber device of the second field bus, and embodiments may be designed in such a way that the gateway takes on the function of a time-aware scheduler for the second field bus. The described communication of a request and a confirmation may thus take place exclusively internally in the gateway, since the gateway is a subscriber device of both the first and the second field bus. In cases of this type, there is no need, for example, to conduct a communication of the request of the second field bus to the first field bus and a communication of the confirmation message from the first field bus to the second field bus via the physical layers of the field buses.

The gateway may receive the request of the second field bus. To identify the subscriber devices which are to exchange the time-sensitive data, the request may contain an identifier of the data source and the data destination. For example, it may contain the first subscriber device identifier or another identifier, which may be used in the second field bus to identify the first subscriber device. The request may furthermore contain the second subscriber device identifier or another identifier, which identifies the second subscriber device or its virtual copy.

In the opposite direction, the gateway receives a confirmation message from the first field bus. The confirmation message may be sent from the time-aware scheduler for the first field bus. The gateway then forwards the confirmation message to the second field bus, for example to a subscriber device having the scheduler function, which carries out, for the second subscriber device, the configuration of a time slot for transmitting time-sensitive data.

The communication of the described request and confirmation may be conducted via a virtual copy of a subscriber device in the first field bus, in particular a virtual copy of a time-aware scheduler in the first field bus. The virtual copy may initially be identified in the gateway via a corresponding subscriber device identifier in the second field bus. The virtual copy then has a proxy function for the actual time-aware scheduler in the first field bus.

The request received (by the gateway) comprises a time indication of at least one point in time and/or at least one time interval. The time indication is related to the time domain of the second field bus. The method also comprises a determination by the gateway of the time indication from the received request relating to the time domain of the first field bus, taking into account the time offset with regard to the reference time. The request forwarded by the gateway to the first field bus comprises the time indication relating to the time domain of the first field bus.

The request may be precisely defined by a time indication of this type. For example, points in time and intervals may be communicated, which are to be available or excluded in the second field bus for a time-sensitive communication. The request may have the character of a "command," it being necessary for a time slot for time-sensitive communication to be configured by the second field according to the time indication, or it may have the character of a "negotiation basis," the second field bus further specifying the time indication.

In the present case, the time indication may be transmitted to the gateway by a subscriber device of the second field bus relating to the time domain of the second field bus, the gateway being able to carry out a conversion of the time indication relating to the first field bus.

The method may furthermore comprise a setting of a first time slot for communicating time-sensitive data in the first field bus by the first field bus, based on the time indication from the request relating to the first time domain of the first field bus, and a setting of a second time slot for communicating time-sensitive data in the second field bus by the second field bus, based on the time indication relating to the second time domain of the second field bus. The setting of the first time slot by the first field bus and the setting of the second time slot by the second field bus each take place in such a way that the first time slot of the first field bus and the second time slot of the second field bus overlap in time. Since the corresponding time indications in the first and second field buses are each present with respect to their own time regimes, a conversion of the time indication by subscriber devices of the first and second field buses does not take place. Nevertheless, they may define the first and second time slots in such a way that the time slots overlap in time. The time slots in the first and second field buses may be set by corresponding subscriber devices, for example having the corresponding function of a time-aware scheduler. If this functionality takes place in the gateway, which may also be a subscriber device of the first or second field bus, the communication may take place at least partially internally in the gateway in connection with the setting of the time slots.

The confirmation message received from the first field bus can comprise a further time indication of at least one point in time and/or at least one time interval, the aforementioned further time indication being related to the time domain of the first field bus. The method also comprises a determination by the gateway of the further time indication from the received confirmation message relating to the time domain of the second field bus, taking into account the time offset with regard to the reference time. The confirmation message forwarded to the second field bus comprises the further time indication relating to the time domain of the second field bus, the setting of the first time slot by the first field bus being based on the aforementioned further time indication, and the setting of the second time slot by the second field bus being based on the aforementioned further time indication. In this way, it is not only possible for the request message to contain a time indication, but the confirmation message may also contain a further time indication. Time indications other than those of the request may be proposed therein, for example on the part of the first field bus, or a preceding time indication may be specified. The gateway converts the further time indication with regard to the time regime of the particular field bus, so that no associated conversions need to be made in the field buses. The described request to the first field bus and the described confirmation with exchange of time indications may also be part of a more comprehensive protocol for configuring time slots for communicating time-sensitive data, further messages having time indications being exchange between the field buses.

The method also can comprise a receipt by the gateway of time-sensitive data from the first subscriber device of the first field bus, the time-sensitive data containing the second subscriber device identifier, during the overlapping of the first time slot and the second time slot. The method furthermore comprises the determination by the gateway of an identifier of the second subscriber device, based on the second subscriber device identifier during the overlapping of the first time slot and the second time slot. The received time-sensitive data continue to be forwarded by the gateway to the second subscriber device during the overlapping of the first time slot and the second time slot.

The second subscriber device indicator can be used to identify the second subscriber device for the first field bus. The first subscriber device of the first field bus may address the time-sensitive data to the virtual copy of the second subscriber device, by which the second subscriber device may be addressed as a subscriber device of the first field bus. The gateway then forwards the data to the assigned second subscriber device of the second field bus, using the identifier thereof. For example, the identifiers may represent network addresses (MAC addresses or IP addresses), the gateway exchanging the destination address of a physical data unit (MAC PDU, IP data packet).

The receipt, determination of the identifier and forwarding of the time-sensitive data by the gateway take place during the time overlapping of the first and second time slot. Such a transfer of the time-sensitive data may take place in that the gateway provides a termination point for the physical layer on the part of the second field bus. The gateway can then receive, demodulate and, if necessary, decode the physical signals (e.g., with regard to the channel coding), so that the time-sensitive data are available at the upper edge of the physical layer as data bits. In one example, the forwarding of the data may take place in the so-called Medium Access Control (MAC) protocol layer via a so-called MAC bridge (e.g., according to the IEEE 802.ID standard). For example, this enables the MAC protocol header to be read out for forwarding to the other field bus and to be changed with the aid of the identifier of the second subscriber device. The transfer of the data may also take place on a higher protocol layer than the MAC layer, the gateway providing the corresponding protocol stack. Slight delays may result due to the signal and data processing in the gateway. Since the first or the second time slot is, however, reserved for the transmission of the time-sensitive data, and an overlap area exists in both time slots, a buffering in queues may be largely avoided. The occurring delays may thus be kept predictable and manageable, so that the real-time requirements of the transmission are met.

It is possible in practice that, along with the time offset between the first and second time domains, further time differences exist, e.g., with regard to different durations of the first and second time slots as well as the temporal position of the first and second time slots for the transmission of time-sensitive data. Time-sensitive data may be transmitted between the field buses by the gateway in an area, in which the first and second time slots overlap. Nevertheless, time slots for transmitting time-sensitive data may be reserved in the first or second field bus outside the overlap area, these time periods being able to be used independently of each other, for example, for transmitting time-sensitive data within the field buses.

The gateway may include a first timer and a second timer for carrying out the mentioned frequency synchronization of the first and second time domains. To synchronize the frequencies of the two field buses, for example, the first timer of the gateway may be synchronized as a slave with the first time domain of the first field bus. In addition, the second timer of the gateway may be synchronized as a slave with the second time domain of the second field bus. The frequency of the first timer may then be initially synchronized exclusively as a slave with the frequency of the second time domain of the second timer, and the first timer may subsequently be set as the master for the first field bus for the purpose of setting the frequency (of the first field bus) to the frequency of the first timer.

Since the gateway has dedicated timers, whose frequencies are synchronized (e.g., exclusively) with each other, the gateway knowns the time defined in the first and second time domains in each case and may coordinate, for example, the transmission of non-time-sensitive data in such a way that the time slots for transmitting time-sensitive data are not affected. In addition, it is guaranteed after the completed frequency synchronization that the time differences between the field buses are still present but are time-invariant and thus do not "keep going." In the described scenario, the first field bus derives its time base from the second field bus, the setting of the first timer as the master for the first field bus representing only a minor intervention into the time regime of the first field bus. For example, the setting to the frequency of the first timer may take place over a time period which avoids a hard time jump. The first field bus may thus be synchronized "under load" during operation.

A further aspect of the invention relates to a system for networking at least two time-sensitive field buses. The system includes a first time-sensitive field bus, which comprises a first subscriber device and has a first dedicated time domain. The system also includes a second time-sensitive field bus, which comprises a second subscriber device and has a second dedicated time domain, the first time domain and the second time domain being frequency-synchronized. The system furthermore includes a gateway, which connects the first and second field buses to each other. The gateway includes a memory for storing a first subscriber device identifier in the memory of the gateway, the first subscriber device identifier identifying a virtual copy of the assigned first subscriber device of the first field bus. The gateway includes a memory for storing a second subscriber device identifier in the memory of the gateway, the second subscriber device identifier identifying a virtual copy of the assigned second subscriber device of the second field bus. The method furthermore includes a detminator for determining a first cycle duration of the first field bus and a second cycle duration of the second field bus by the gateway at a reference time, as well as a determinator for determining a time offset between the first time domain and the second time domain by the gateway at the reference time. The system is configured to carry out the steps (e.g., all steps) of the method described above.

A further aspect of the invention relates to a gateway for networking a first time-sensitive field bus with a second time-sensitive field bus, the first time-sensitive field bus comprising a first subscriber device and having a first dedicated time domain, and the second time-sensitive field bus comprising a second subscriber device and having a second dedicated time domain, the first time domain and the second time domain being frequency-synchronized. The gateway comprises a connector for connecting the first time-sensitive field bus and the second time-sensitive field bus to the gateway in each case, a memory for storing a first subscriber device identifier in the memory of the gateway, the first subscriber device identifier identifying a virtual copy of the assigned first subscriber device of the first field bus, as well as a memory for storing a second subscriber device identifier in the memory of the gateway, the second subscriber device identifier identifying a virtual copy of the assigned second subscriber device of the second field bus. The gateway furthermore includes a determinator for determining of a first cycle duration of the first field bus and a second cycle duration of the second field bus at a reference time, and a determinator for determining a time offset between the first time domain and the second time domain by the gateway at the reference time.

The gateway also comprises a receiver for receiving a request of the second field bus of a time slot to transmit time-sensitive data from the first subscriber device of the first field bus to the second subscriber device of the second field bus. The gateway also includes a transmitter for forwarding the request to the first field bus as well as a receiver for receiving a confirmation message from the first field bus and a transmitter for forwarding the confirmation message to the second field bus.

The received request comprises a time indication of at least one point in time and/or at least one time interval, the time indication relating to the time domain of the second field bus. The gateway includes a determinator for determining the time indication from the received request relating to the time domain of the first field bus, taking into account the time offset with regard to the reference time. The request forwarded to the first field bus comprises the time indication relating to the time domain of the first field bus.

The gateway comprises a determinator for determining a time overlap of a first time slot set by the first field bus for communicating time-sensitive data in the first field bus and a second time slot set by the second field bus for communicating time-sensitive data in the second field bus. The gateway furthermore comprises a receiver for receiving time-sensitive data from the first subscriber device of the first field bus, the time-sensitive data containing the second subscriber device indicator during the overlapping of the first time slot and the second time slot, the determinator for determining an identifier of the second subscriber device, based on the second subscriber device identifier, during the overlapping of the first time slot and the second time slot, as well as a transmitter for forwarding the received time-sensitive data to the second subscriber device during the overlapping of the first time slot and the second time slot.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
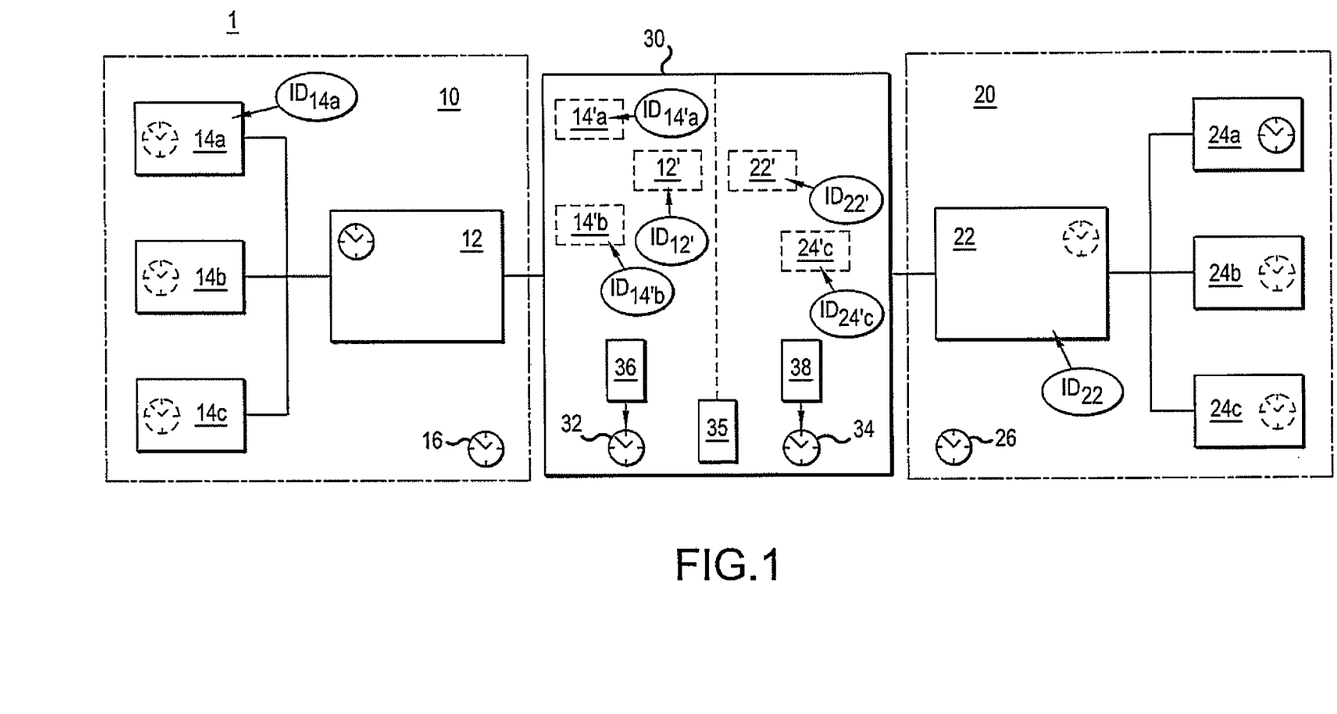
FIG. 1 shows a block diagram of a system including a first time-sensitive field bus and a second time-sensitive field bus.

FIG. 1 shows a block diagram of an exemplary system 1, including a first time-sensitive field bus 10 and a second time-sensitive field bus 20. First field bus 10 and second field bus 20 comprise, for example, subscriber devices 12, 14a-c or 22, 24a-c, subscriber devices 12, 22 each being controllers of the field bus, for example an automation device, a programmable logic controller, PLC, a node or another industrial controller, and subscriber devices 14a-c or 24a-c being field devices, for example I/O modules for sensors and/or actuators, which may measure or influence variables of a process automated by the field bus. Subscriber devices 12, 14a-c or 22, 24a-c are communicatively connected to each other in particular field bus 10, 20 via an interface, the definition of the interface comprising an interface protocol.

Subscriber devices 12, 14a-c of first field bus 10 belong to a first time domain 16, all subscriber devices 12, 14a-c having the same understanding of an absolute time. For this purpose, each subscriber device 12, 14a-c has a timer, which is schematically symbolized in FIG. 1 by the face of a clock. Subscriber devices 22, 24a-c of second field bus 20 correspondingly belong to a second time domain 26. In field buses 10 and 20, the field bus lines emerging from controller 12, 22 are connected to the field buses in a star shape. Field buses may also generally be formed by other topologies, such as a tree topology, bus topology, ring topology, etc. It is also possible that subscriber devices 12, 24a-c or 22, 24a-c of a field bus 10, 20 are at least partially connected to each other by a wireless network.

One subscriber device 12, 24a-c or 22, 24a-c in each case predefines the time for particular field bus 10 or 20 and is therefore referred to as the master. In first field bus 10, controller 12, for example, is initially the master, which is represented in FIG. 1 as a clock face with solid lines. In second field bus 20, subscriber device 24a, for example, is the field bus master. The clock of a master 12 or 24a predefines the time in the field bus in each case, the remaining subscriber devices of a field bus, i.e., subscriber devices 14a-c in the first field bus or subscriber devices 22, 24b-c, each derive their time from the master. This is done, for example, in that the subscribers within a field bus exchange messages at regular or irregular intervals according to the Precision Time Protocol according to the IEEE 1588 standard and thus obtain and maintain a common understanding of the time in this way.

Within first field bus 10 and second field bus 20, non-time-sensitive as well as time-sensitive data may be transmitted in each case, as is described in greater detail below. For example, the data transmission in the two field buses may be divided into transmission cycles according to the IEEE 802.1Q standards. Different cycle durations may be defined for first field bus 10 and second field bus 20. Since different time domains 16 and 26 are assigned to each of first field bus 10 and second field bus 20, the cycle times in this case may also be viewed as being assigned to the time domain.

In addition, first times slots may be defined in first field bus 10, and second time slots may be defined in second field bus 20, in which a transmission of real-time data is possible between two subscriber devices of the same field bus in each case. The transmission of the real-time data may be a clocked end-to-end transmission between two subscriber devices or a transmission having slight delays, which are known, deterministically and/or causally manageable, insofar as they meet real-time requirements.

One or multiple subscriber devices of the particular field bus may have a scheduler function for the definition of the transmission cycles and the time slots for transmitting time-sensitive data. The scheduler is responsible for defining the cycle durations in the first or second field bus and to communicate them to the other subscriber devices of the particular field bus. Furthermore, a scheduler may be configured to receive requests with regard to the transmission of time-sensitive data in the first or second field bus, to manage assigned time slots, to conduct a communication with a requesting subscriber device to negotiate time slots for the time-sensitive transmission, and to confirm or reject the request accordingly. The scheduler may also be configured to communicate assigned time slots for transmitting time-sensitive data to the other subscriber devices. It should be assumed below that at least one of subscriber devices 12, 24a-c is configured as the scheduler in first field bus 10 and executes corresponding protocols (e.g., according to the IEEE 802.1Q standard or a standard derived therefrom). It is also assumed that at least one of subscriber devices 22, 24a-c performs the scheduler function in second field bus 20.

System 1 further comprises a gateway 30, via which both field buses 10, 20 are communicatively connected to each other. FIG. 1 shows that field buses 10, 20 are connected to each other via their controllers 12 and 22. However, this is not absolutely necessary. Instead, gateway 30 has an interface to each of field buses 10 and 20, so that it represents a subscriber device with respect to particular field bus 10, 20. Gateway 30 supports at least two time domains 32 and 34, which during coupling, are aligned with the time domains of field buses 16 and 26 as part of the particular time domains. Further time domains may be supported according to the number of field buses to be coupled. In particular, the gateway comprises timers 36 and 38, which may be configured for first time domain 16 or for second time domain 26.

The subscriber devices of the field buses may be addressed via identifiers. For this purpose, FIG. 1 shows an example of identifier ID14a of a first subscriber device 14a in the first field bus as well as identifier ID22 of a second subscriber device 22 in the second field bus. It is only an example that second subscriber device 22 is also the controller in the second field bus. The identifier may be, for example, MAC addresses, IP addresses or other identifiers, as mentioned above.

In addition, the gateway may maintain virtual copies of some subscriber devices of the field buses in its memory. FIG. 1 illustrates examples of virtual copies 12', 14'a, 14'b as well as 22', 24'c, which are each addressable via their subscriber identifiers ID12', ID14'a, ID14'b as well as ID22', ID24'c. The virtual copies of the particular subscriber devices are assigned mutually to the particular subscriber devices, i.e., subscriber device 14a in first field bus 10 is assigned to its virtual copy 14'a and vice versa, subscriber device 14b is assigned to its virtual copy 14'b and vice versa, subscriber device 12 is assigned to its virtual copy 12' and vice versa, and subscriber device 22 in second field bus 20 is assigned to its virtual copy 22' and vice versa. In this way, one or multiple subscriber devices in the first or second field bus may each be assigned a virtual copy.

The virtual copies may appear as subscriber devices in the other field bus in each case. For example, virtual copies 12', 14'a and 14'b may appear as subscriber devices of second field bus 20, even though their assigned real devices are subscriber devices of first field bus 10. Likewise, in the example in FIG. 1, virtual copy 22' may appear as a subscriber device in first field bus 10, although assigned subscriber device 22 in second field bus 20 is connected. The virtual copies may be addressed via their assigned subscriber device identifiers. For example, virtual copies 12', 14'a, 14'b may each be identified and addressed via their assigned subscriber device identifiers ID12', ID14'a, ID14'b for other subscriber devices in second field bus 20. Likewise, virtual copies 22', 24'c may be identified and addressed via their assigned subscriber device identifiers ID22', ID24'c for the other subscriber devices in first field bus 10.

In this way, it is possible to integrate subscriber devices of another field bus into a field bus. The corresponding virtual copies have a corresponding interface with respect to the field bus communication protocol (e.g., based on Ethernet). For example, virtual copies 12', 14'*a*, 14'*b* may participate in the communication protocol of second field bus 20. With regard to second field bus 20, they form termination points of the field bus communication protocols in the same way as do the "real" subscriber devices of second field bus 20. Likewise, virtual copies 22', 24'*c* represent a termination point of the field bus communication protocols as an interface to first field bus 10.

Figure 2:
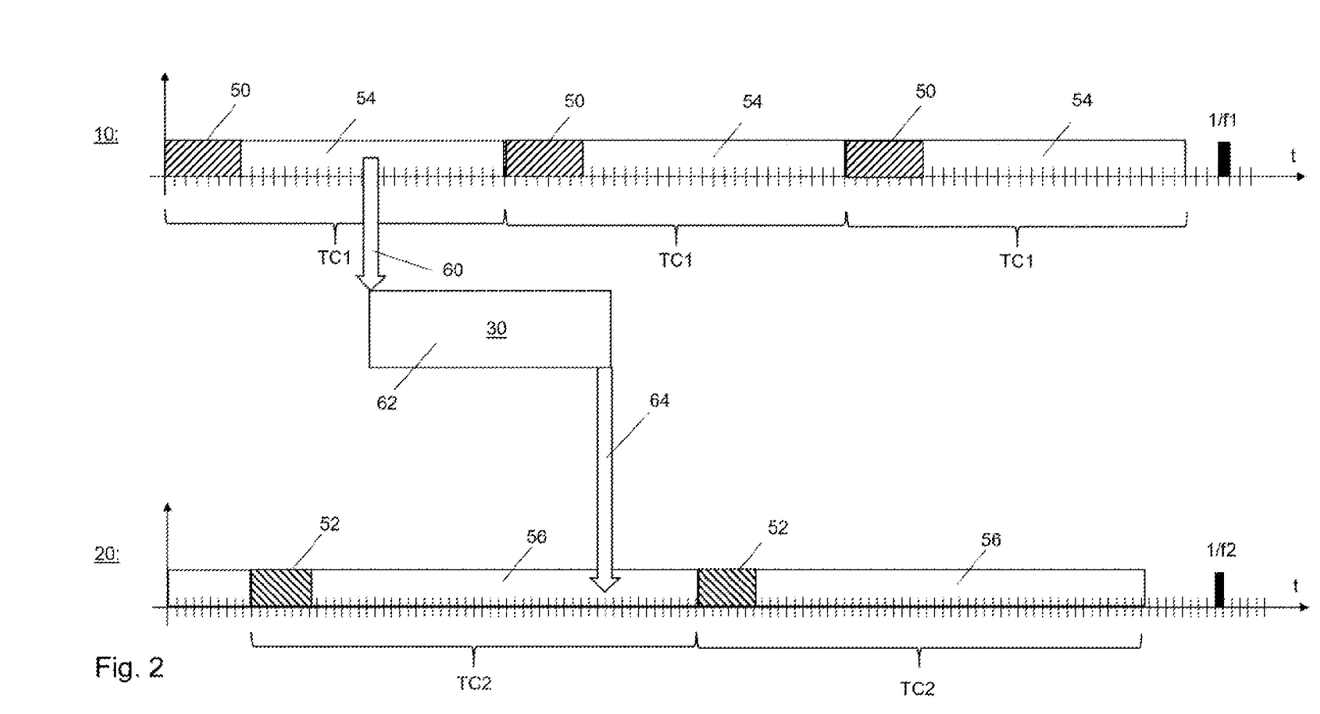
FIG. 2 schematically shows a timing diagram of a first and second field bus as well as the transmission of non-time-sensitive data through the gateway.

FIG. 2 shows an example of a timing diagram of first field bus 10 and second field bus 20. First field bus 10 has communication or transmission cycles with periodically recurring cycle intervals TC1, which are defined by position and duration according to the upper timeline in FIG. 2. Second field bus 20 correspondingly has communication cycles with periodically recurring cycle intervals TC2, which are defined by position and duration according to the lower timeline in FIG. 2. In FIG. 2, the reciprocal value of clock frequencies 1/f1 or 1/f2, namely the clock cycle duration, is illustrated in each case by a black bar. Even if both clock frequencies f1 and f2 nominally have the same frequencies (i.e., according to a specification), the clocks of time domains 16 and 26 of the two field buses run at different speeds, if the actual values of clock frequencies f1 and f2 differ slightly from each other.

In field buses 10, 20, first time slots 50 or second time slots 52 may be defined, negotiated or ascertained for transmitting time-sensitive data within particular field bus 10, 20. For example, for this purpose, one of subscriber devices 12, 14*a-c* in first field bus 10 as well as one of subscriber devices 22, 24*a-c* in second field bus 20 may be configured as a time-aware scheduler according to the IEEE 802.1QBV standard. First time slots 50 and second time slots 52 coincide with the start of corresponding communication cycles only by way of example. Time slots 50, 52 for time-sensitive transmission may generally be situated at any position within a transmission cycle. It is also possible to define multiple separate time slots 50, 52 per transmission cycle for a time-sensitive communication.

FIG. 2 also shows time periods 54 and 56, which belong to the particular transmission cycles, which are situated outside time slots 50 or 52 reserved for transmitting time-sensitive data. At these intervals 54, 56, non-time-sensitive data may be transmitted within field buses 10, 20, for example according to the Ethernet protocol, to which the CSMA/CD (carrier-sense multiple access with collision detection) access method applies.

Timers 36 and 38 of gateway 30 are first synchronized as slaves with respect to time domains 16, 26 of field buses 10 and 20 for the purpose of connecting gateway 30. As a result, the gateway has a synchronized interface as a subscriber device to first field bus 10 as well as to second field bus 20. For example, the time offset between time domain 16 of first field bus 10 and time domain 26 of second field bus 20 may thus be observed on the part of gateway 30. Corresponding cycle durations TC1 and TC2, the temporal position of the communication cycles as well as time slots 50 and 52, in which time-sensitive communication is handled in particular field buses 10, 20, are furthermore known on the part of gateway 30.

This makes it possible to initially exchange non-time-sensitive data between the field buses. A transmission of this type may take place, for example, in that non-time-sensitive data 60 are transmitted from first field bus 10 to gateway 30 during a first non-time-sensitive interval 54, as symbolized by arrow 60 in FIG. 2. These data 60 may be buffered in a buffer 35 of gateway 30 (also see FIG. 1), as symbolized by step 62 (in FIG. 2). Finally, the buffered data may be transmitted from gateway 30 to second field bus 20 during intervals 56 outside second time slots 52, as symbolized by arrow 64. For example, to send data 64 to the second field bus with the aid of the CSMA/CD method or another contention method, gateway 30 must ensure that second field bus 20 is free for transmission during time slots 56.

An exchange of non-time-sensitive data 60, 64 between the field buses may be used, for example, to support a frequency synchronization of first time domain 16 and second time domain 26. Due to such a synchronization of the timer clock frequencies, the time offset between the times of the two time domains 16 and 26 remains stable, whereby the determination of points in time in gateway 30 or in subscriber devices 12, 14*a-c* or 22, 24*a-c* of the first and second field buses is simplified with respect to the other time domain 16, 26 in each case. For this purpose, the following method is described by way of example for synchronizing clock frequencies f1 and f2 of timers 36 and 38. Timers 36, 38 of gateway 30 are initially synchronized as slaves of first time domain 16 or second time domain 26 and have the same nominal frequency. A frequency synchronization may take place only in that first timer 36 of gateway 30 is determined as the master for first field bus 10, so that gateway 30 is able to make a determination by setting the time in the first field bus. Furthermore, a synchronization of frequency f1 of first timer 36 of gateway 30 may be made to frequency f2 of second time domain 26. A synchronization exclusively of frequencies f1 and f2 in time domains 16, 26 may avoid time jumps of the subscriber devices in first field bus 10. The frequency may be synchronized during the operation of first field bus 10 via an adjustment duration, which is selected to be long enough for the processes of first field bus 10 to run without disturbances.

Figure 3:
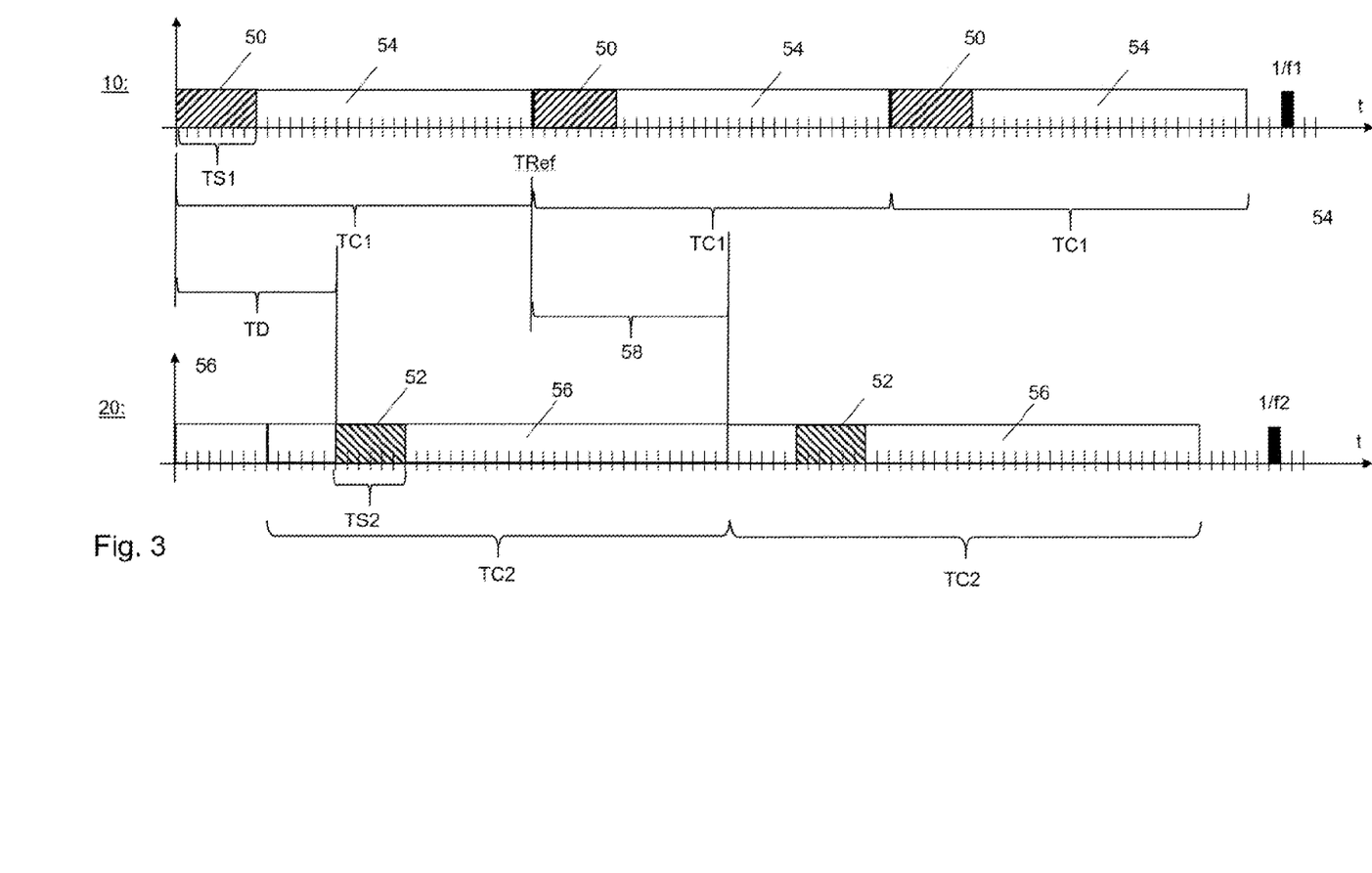
FIG. 3 schematically shows a detailed timing diagram of the cycle times defined for the first and second field buses.

FIG. 3 schematically shows a detailed timing diagram of the cycle times defined for first and second field buses 10, 20 according to some aspects of the invention. In one example, the timers in the subscriber devices of field buses 10 and 20 may have the same clock frequencies f1=f2, for example, according to the method described above. In FIG. 3, the reciprocal value of clock frequencies 1/f1 or 1/f2, namely the clock cycle duration, is illustrated in each case by a black bar.

In the present example, only the clock frequencies between first and second field buses 10, 20 are now synchronized. A time offset 58 may therefore occur between the starting times of the communication cycles. A time offset 58 of this type results, on the one hand, due to the different definitions of the time in the two field buses 10, 20, and, on the other hand, from the difference between the starting times of the communication cycles of first field bus 10 and second field bus 20, even if both field buses were to have the same understanding of time. The communication cycles may also have different durations TC1 and TC2. Time offset 58 may therefore generally be defined only with respect to an (absolute) reference time TRef. Absolute reference time TRef may be expressed accordingly in the time of first field bus 10 as well as in the time of second field bus 20. If time durations TC1 and TC2 are in a rational relationship to each other, a particular time offset 58 recurs after a predictable number of cycles of the first or second field bus. In this case, reference time TRef may be arbitrarily selected within a recurrence interval. For example, if cycle duration TC1 in the first field bus is 50 ms, and cycle duration TC2 in the second field bus is 25 ms, for example, time offset 58 may be zero after a first cycle in the second field bus, 25 ms with respect to the first field bus after a second cycle in the second field bus, and then zero again, etc. However, if time offset 58 is known at a point in time TRef, it is possible to determine time offset 58 in advance for all communication cycles of the first and second field buses, even if cycle durations TC1 and TC2 are not in a rational relationship to each other.

Moreover, different durations TS1 and TS2 of first and second time slots 50 and 52 for the time-sensitive communication may occur on field buses 10 and 20, since they may be specified independently of each other for both field buses 10 and 20. In addition, first and second time slots 50 and 52 may have time differences TD in terms of their start times. These, in turn, may generally be predictably determined only with respect to an absolute reference time TRef, since start times of time slots 50 and 52 for the time-sensitive communication may vary with the cycle times in the individual field buses.

After the frequencies have been synchronized, gateway 30 may determine cycle durations TC1 and TC2 in first and second field buses 10, 20 at a reference time TRef. Gateway 30 may furthermore determine time offset 58 between first and second time domains 16, 26 at a reference time TRef. Gateway 30 may additionally communicate cycle duration TC1 of first field bus 10 to second field bus 20 and communicate cycle duration TC2 of second time domain 20 to first field bus 10. This may take place with respect to reference time TRef. In this way, for example, subscriber devices of first or second field bus 10, 20 may predictably determine the communication cycles of the other field bus 10, 20 in each case.

In addition, virtual copies of subscriber devices of a field bus may be instantiated as part of the other field bus in the memory of gateway 30. The virtual copies are initialized hereby, for example, with the aid of their corresponding subscriber device identifiers as well as the assignments with respect to their real field bus subscriber devices. In the example in FIG. 1, virtual copies 12', 14'a, 14'b are instantiated with respect to subscriber devices 12, 14a, 14b of first field bus 10, corresponding subscriber device identifiers ID12', ID14'a, ID14'b, for example, being assigned to corresponding subscriber devices 12, 14a, 14b. This may take place, for example, with the aid of corresponding assignment tables, which are stored in gateway 30 and/or the assigned subscriber devices. Virtual copies 22', 24'c may be similarly instantiated with respect to subscriber devices 22 and 24c of second field bus 20.

In order for the virtual copies to act in each case as subscriber devices of the other field bus, gateway 30 knows the corresponding times of the time domains. In particular, gateway 30 knows time offset 58 between first and second time domains 16, 26 at reference time TRef. Moreover, gateway 30 knows cycle duration TC1 of first field bus 10 as well as cycle duration TC2 of second field bus 20 as well as the times of first and second time slots 50 and 52 for the time-sensitive communication defined in the first and second field buses. For example, the virtual copies may have read access to the memory of gateway 30 for this purpose.

In this way, gateway 30 may convert time indications, i.e., indications of at least one point in time and/or at least one time interval, which are present with respect to the time domains of a field bus, into time indications of the other field bus. This may be used by the individual virtual copies in such a way that, for example, virtual copy 14'a may receive a message from second field bus 20 having a time indication relating to the second field bus 20, and upon a forwarding to assigned subscriber device 14a in first field bus 10, convert it into a corresponding time indication relating to first field bus 10. Conversely, virtual copy 14'a may receive a message from assigned subscriber device 14a having a time indication relating to first field bus 10, convert it into a time indication relating to second field bus 20 and output it as a (virtual) subscriber device of second field bus 20 in converted form.

This functionality may be useful, in particular, if, for example, a subscriber device of second field bus 20 would like to direct a request for time slots for transmitting time-sensitive data to first field bus 10. For example, a request protocol of this type is described by way of example below.

Figure 4:
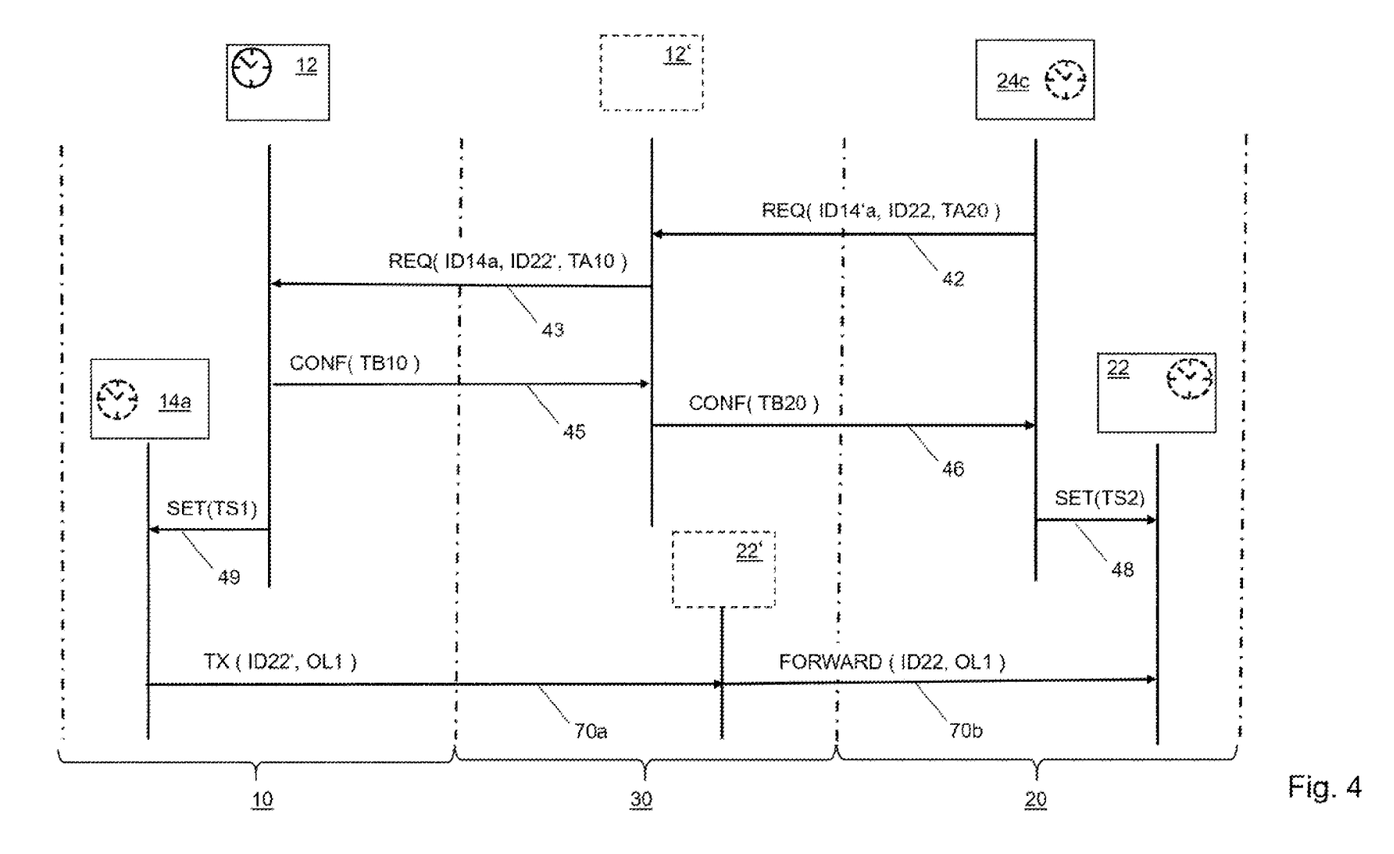
FIG. 4 schematically shows an example of a request protocol for the time slots for transmitting time-sensitive data between the first and second field buses as well as a protocol for transmitting time-sensitive data between the first and second field buses.

FIG. 4 shows an example of a request protocol for time slots for transmitting time-sensitive data between first field bus 10 and second field bus 20. In the present case, a transmission of time-sensitive data is to be set up from subscriber device 14a in first field bus 10 to subscriber device 22 in second field bus 20.

The request itself may originate in a subscriber device in the second field bus. For example, the request may originate in subscriber device 24c in the second field bus, subscriber device 24c being able to have a scheduler functionality in the second field bus, whereby it is able to configure time slots 52 for transmitting time-sensitive data in second field bus 20. Gateway 30 has integrated virtual copies 12', 14'a, 14'b as subscriber devices in second field bus 20. The request may thus be directed to a virtual copy of a subscriber device of the first field bus. In the present case, virtual copy 12' is to be addressed, since assigned subscriber device 12 has, for example, a scheduler functionality in first field bus 10, whereby it is able to configure time slots 50 for transmitting time-sensitive data in first field bus 10.

To request a time slot for transmitting time-sensitive data, subscriber device 24c sends a request 42 to virtual copy 12' of subscriber device 12 in gateway 30. Request 42 contains, for example, subscriber device identifier ID14'a. This subscriber device is known as a virtual copy of the source of the time-sensitive data in the second field bus. In addition, request 42 may contain an identifier of the data destination for the time-sensitive data, for example second subscriber device identifier ID22' or the identifier of real subscriber device ID22. Request 42 may furthermore contain a time indication TA20, i.e., the indication of at least one point in time and/or at least one time interval. This time indication may define, for example, multiple possible time slots, which may be configured in second field bus 20 for a transmission of time-sensitive data. The time indication may be related to the time regime in second field bus 20, i.e., relating to second time domain 26.

Gateway 30 may receive requests 42 directed to virtual copy 12', after which gateway 30 forwards request 43 to subscriber device 12, i.e., to the scheduler in first field bus 10. Gateway 30 may optionally use identifier ID14a of the real subscriber device instead of subscriber device identifier ID14'a. Gateway 30 may furthermore use subscriber device identifier ID22', since the assigned virtual copy in first field bus 10 may be viewed as the identifier for the data destination of the time-sensitive data. If received request 42 contains a time indication TA20, gateway 30 converts it into a time indication TA10, uses the latter for forwarded request 43, which is related to first field bus 10, time offset 58 being taken into account at reference time TRef.

Subscriber device 12 in first field bus 10 may determine a suitable time slot 50 upon receiving request 43 or at a later time and send a confirmation message 45 to gateway 30 for forwarding to second field bus 20. Confirmation message 45 may contain a time indication TB10, which is related to first field bus 10. For example, time indication TB10 may define time slot 52. Upon receipt, gateway 30 converts time indication TB10 into a time indication TB20, which is related to second field bus 20, and forwards it in confirmation message 46 to subscriber device 24c in second field bus 20. Gateway 30 may use virtual copy 12' for this purpose, which is configured for this purpose as a subscriber device in second field bus 20.

Due to the described request protocol, subscriber device 12 in first field bus 10 may configure 49 time slot 50 and subscriber device 24c in second field bus 20 may configure 48 time slot 52, times slots 50 and 52 overlapping.

Figure 5:
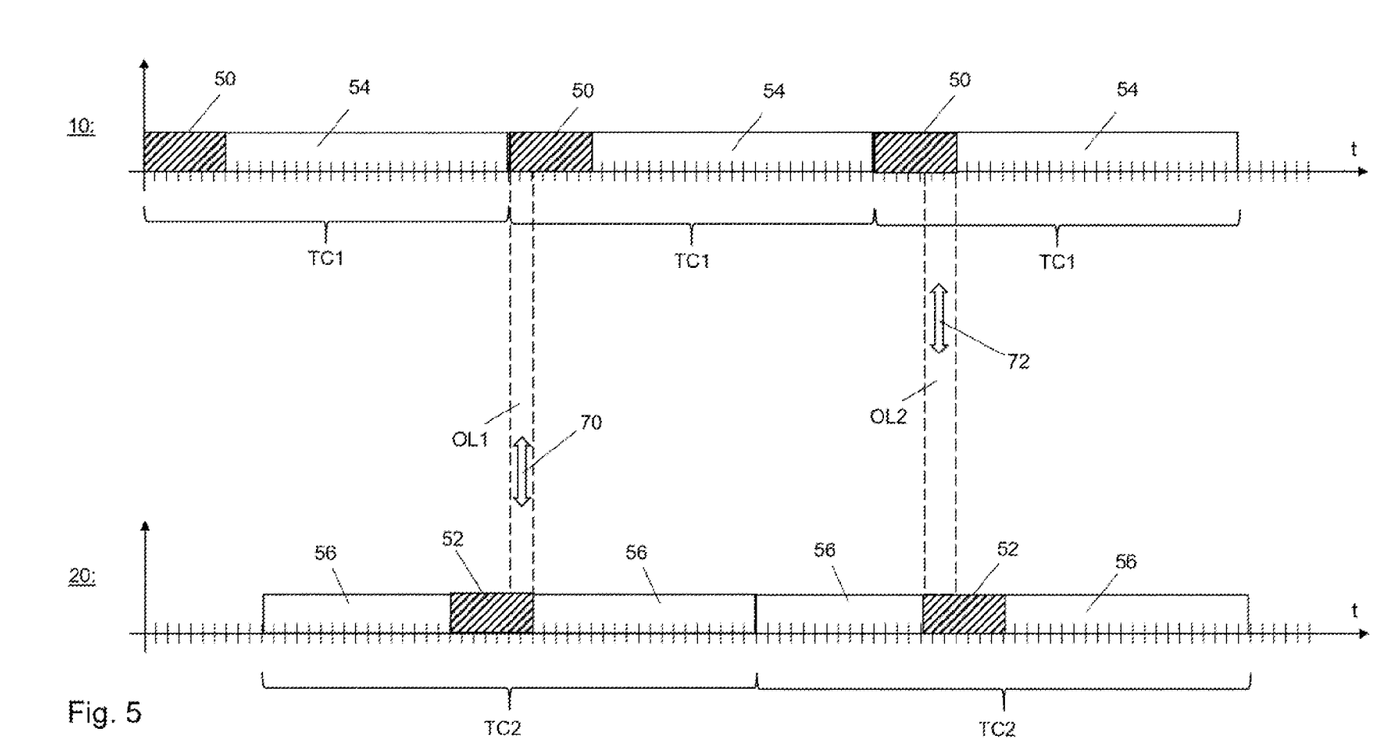
FIG. 5 schematically shows a timing diagram of a first and second field bus as well as the transmission of time-sensitive data by the gateway.

FIG. 5 schematically shows a timing diagram of a first field bus 10 and a second field bus 20 during a transmission of time-sensitive data. In the present case, for example according to the request protocol described above or a comparable protocol, time slots 50 in first field bus 10 as well as time slots 52 in second field bus 20 are specified for transmitting time-sensitive data from subscriber device 14c to subscriber device 24b, which at least partially overlap. In particular, corresponding subscriber devices of the first and second field buses have specified common overlap areas OL1 and OL2 in time slots 50 and 52 and have exchanged this information via gateway 30, so that it is also known to gateway 30.

It may not be necessary to generate an overlap area OL1, OL2 for the time-sensitive communication in each cycle TC1 or TC2 of first or second field bus 10, 20. For example, it may be sufficient to define an overlap area during each second, third, etc. cycle of first or second field bus 10, 20.

If first and second time slots 50 and 52 are known during the communication cycles of first and second field buses 10, 20, which are reserved for a time-sensitive communication within the field buses, overlap areas OL1 and OL2 may be determined or calculated in a rule-based manner for a time-sensitive communication between the field buses. It is then sufficient to determine a single pair of overlapping time slots 50 and 52 at a reference time TRef. The reservation of time slots 50 and 52 may be carried out by the request protocol in the first or second field bus, as described above. Gateway 30 may make the time indications available to first and second time slots 50 and 52, in each case with regard to the field bus-specific time domain. The determination of overlap areas OL1 and OL2 may this also take place in each case with regard to the field bus-specific time domain.

If cycle durations TC1 and TC2 have a rational relationship to each other, recurring overlap areas OL1 and OL2 result on a regular basis. In this case, the negotiation and/or determination of time slots 50 and 52 is/are made easier, so that in these cases an overlap area OL1, OL2 recurs regularly and therefore does not have to be negotiated or determined individually. Reference time TRef may also be arbitrarily selected here within the regularly recurring periods. If cycle durations TC1 and TC2 are the same, the time offset applies regardless of an arbitrarily selectable reference time TRef.

Gateway 30 may further be configured to transmit time-critical data 70, 72 during the temporally overlapping time slots, e.g., OL1 and OL2. This may take place in that gateway 30 ascertains the time slots for time-sensitive transmission 50 and 52 ascertained between first and second field buses 10, 20 and, in particular, particular overlap areas OL1, OL2 and transfers the signals between the first and second field buses during these intervals.

FIG. 4 furthermore shows a protocol for transmitting time-sensitive data between first field bus and second field bus. For this purpose, it is assumed that, for example, the procedure described above for setting temporally overlapping time slots 50, 52 was carried out in the first and second field buses. To send time-sensitive data from subscriber device 14a in the first field bus to subscriber device 22, subscriber device 14a first sends this data 70a during overlapping interval OL1 to gateway 30, data 70a containing subscriber device indicator ID22' for identifying virtual copy 22'. Gateway 30 receives time-sensitive data 70a during overlap interval OL1. For forwarding purposes, the gateway determines assigned identifier ID22 of subscriber device 22 in the second field bus during overlap interval OL1 and sends data 70b to subscriber device 22 in second field bus 20 still during overlap interval OL1.

Due to the described method, system 1 and gateway 30, it is possible to network time-sensitive field buses 10, 20 without having to carry out an alignment of the field bus times as well as the communication cycles of the field buses. In particular, existing and, in part incompatible, field buses may be configured thereby to exchange non-time-sensitive data s well as to exchange time-sensitive data.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for networking a first time-sensitive field bus with a second time-sensitive field bus, the first time-sensitive field bus comprising a first subscriber device and having a first dedicated time domain, and the second time-sensitive field bus comprising a second subscriber device and having a second dedicated time domain, the first time domain and the second time domain being frequency-synchronized, the first and the second field buses being connected to each other via a gateway, the method comprising:

storing a first subscriber device identifier in a memory of the gateway, the first subscriber device identifier identifying a virtual copy of the assigned first subscriber device of the first field bus;

storing a second subscriber device identifier in the memory of the gateway, the second subscriber device identifier identifying a virtual copy of the second subscriber device of the second field bus;

determining, at a reference time via the gateway, a first cycle duration of the first time domain of the first field bus that contains a first time slot for a transmission of time-sensitive data and a second cycle duration of the second time domain of the second field bus that contains a second time slot for a transmission of time-sensitive data; and determining, via the gateway, a time offset between the first time domain and the second time domain at the reference time.

2. The method according to claim 1, further comprising:

receiving, by the gateway, a request from the second field bus for the first time slot for transmitting the time-sensitive data from the first subscriber device of the first field bus to the second subscriber device of the second field bus;

forwarding, by the gateway, the request to the first field bus;

receiving, by the gateway, a confirmation message from the first field bus;

forwarding, by the gateway, the confirmation message to the second field bus.

3. The method according to claim 2, wherein the received request comprises a time indication of at least one point in time and/or at least one time interval, the time indication relating to the second time domain of the second field bus, wherein the method further comprises a determination, by the gateway, of the time indication from the received request relating to the first time domain of the first field bus taking into account the time offset with regard to the reference time, wherein the request forwarded to the first field bus comprises the time indication relating to the first time domain of the first field bus, wherein the method further comprises:
  setting the first time slot for communicating the time-sensitive data in the first field bus by the first field bus based on the time indication from the received request relating to the first time domain of the first field bus; and
  setting the second time slot for communicating the time-sensitive data in the second field bus by the second field bus based on a time indication relating to the second time domain of the second field bus, and
  wherein the setting of the first time slot by the first field bus and the setting of the second time slot by the second field bus each take place such that the first time slot of the first field bus and the second time slot of the second field bus overlap in time.

4. The method according to claim 3, wherein the received confirmation message from the first field bus comprises a further time indication of at least one point in time and/or at least one time interval, the further time indication relating to the first time domain of the first field bus, wherein the method further comprises a determination, by the gateway, of the further time indication from the received confirmation message relating to the second time domain of the second field bus taking into account the time offset with regard to the reference time, wherein the confirmation message forwarded to the second field bus comprises the further time indication relating to the second time domain of the second field bus, wherein the setting of the first time slot by the first field bus is based on the further time indication, and wherein the setting of the second time slot by the second field bus is based on the further time indication.

5. The method according to claim 3, wherein the method further comprises:
  receiving, by the gateway, the time-sensitive data from the first subscriber device of the first field bus, the time-sensitive data containing the second subscriber device identifier of the virtual copy of the second subscriber device during the overlapping of the first time slot and the second time slot;
  determining, by the gateway, an identifier of the second subscriber device based on the second subscriber device identifier of the virtual copy of the second subscriber device during the overlapping of the first time slot and the second time slot; and
  forwarding, by the gateway, the received time-sensitive data to the second subscriber device during the overlapping of the first time slot and the second time slot.

6. The method according to claim 3, wherein the following is provided between the first field bus and the second field bus:
  different durations of the first and second time slots for the time-sensitive data; and/or
  at least one time difference of the first and second time slots for the time-sensitive data.

7. The method according to claim 1, wherein the gateway includes a first timer and a second timer, and wherein the first time domain and the second time domain are frequency-synchronized by:
  synchronizing the first timer as a slave with the first time domain of the first field bus;
  synchronizing the second timer as a slave with the second time domain of the second field bus;
  initially synchronizing only the frequency of the first timer as a slave with the frequency of the second time domain of the second timer; and
  setting the first timer as the master for the first field bus to set the frequency of the first field bus to the frequency of the second timer.

8. A system for networking at least two time-sensitive field buses, the system comprising:
  a first time-sensitive field bus, which comprises a first subscriber device and a first dedicated time domain;
  a second time-sensitive field bus, which comprises a second subscriber device and a second dedicated time domain, the first time domain and the second time domain being frequency-synchronized;
  a gateway, which connects the first and second field buses to each other, the gateway comprising:
    at least one memory for storing a first subscriber device identifier, the first subscriber device identifier identifying a virtual copy of the first subscriber device of the first field bus and for storing a second subscriber device identifier in the gateway, the second subscriber device identifier identifying a virtual copy of the second subscriber device of the second field bus;
    at least one processor to determine, at a reference time, a first cycle duration of the first time domain of the first field bus that contains a first time slot for a transmission of time-sensitive data and a second cycle duration of the second time domain of the second field bus that contains a second time slot for a transmission of time-sensitive data and to determine a time offset between the first time domain and the second time domain at the reference time.

9. The system according to claim 8, wherein the gateway further comprises:
  a receiver to receive a request from the second field bus for the first time slot for transmitting the time-sensitive data from the first subscriber device of the first field bus to the second subscriber device of the second field bus;
  a forwarder to forward the request to the first field bus;
  a receiver to receive a confirmation message from the first field bus; and
  a forwarder to forward the confirmation message to the second field bus.

10. The system according to claim 9, wherein the received request comprises a time indication of at least one point in time and/or at least one time interval, the time indication relating to the second time domain of the second field bus, wherein the gateway determines the time indication from the received request relating to the first time domain of the first field bus taking into account the time offset with regard to the reference time, wherein the request forwarded to the first field bus comprises the time indication relating to the first time domain of the first field bus, wherein the first field bus sets the first time slot for communicating the time-sensitive data in the first field bus based on the time indication from the request relating to the first time domain of the first field bus, wherein the second field bus sets the second time slot for communicating the time-sensitive data in the second field bus based on a time indication relating to the second time domain of the second field bus, and wherein the setting of the first time slot by the first field bus and the setting of the second time slot by the second field bus each take place such that the first time slot of the first field bus and the second time slot of the second field bus overlap in time.

11. The system according to claim 10, wherein the confirmation message received by the gateway from the first field bus comprises a further time indication of at least one point in time and/or at least one time interval, the further time indication relating to the first time domain of the first field bus, wherein the at least one processor determines the further time indication from the received request relating to the second time domain of the second field bus taking into account the time offset with regard to the reference time, wherein the confirmation message forwarded to the second field bus comprises the further time indication relating to the second time domain of the second field bus, wherein the setting of the first time slot by the first field bus is based on the further time indication, and wherein the setting of the second time slot by the second field bus is based on the further time indication.

12. The system according to claim 10, wherein the gateway includes a receiver for receiving the time-sensitive data from the first subscriber device of the first field bus, the time-sensitive data containing the second subscriber device identifier of the virtual copy of the second subscriber device during the overlapping of the first time slot and the second time slot, wherein the at least one processor determines an identifier of the second subscriber device based on the second subscriber device identifier of the virtual copy of the second subscriber device during the overlapping of the first time slot and the second time slot, and wherein the gateway forwards the received time-sensitive data to the second subscriber device during the overlapping of the first time slot and the second time slot.

13. A gateway for networking a first time-sensitive field bus with a second time-sensitive field bus, the first time-sensitive field bus comprising a first subscriber device and having a first dedicated time domain, and the second time-sensitive field bus comprising a second subscriber device and having a second dedicated time domain, the first time domain and the second time domain being frequency-synchronized, the gateway comprising:
 a connector to connect the first time-sensitive field bus and the second time sensitive field bus to the gateway;
 at least one memory to store a first subscriber device identifier, the first subscriber device identifier identifying a virtual copy of the first subscriber device of the first field bus, and to store a second subscriber device identifier, the second subscriber device identifier identifying a virtual copy of the second subscriber device of the second field bus;
 a processor to determine, at a reference time, a first cycle duration of the first time domain of the first field bus that contains a first time slot for a transmission of time-sensitive data and a second cycle duration of the second time domain of the second field bus that contains a second time slot for a transmission of time-sensitive data; and
 the processor determining a time off set between the first time domain and the second time domain at the reference time.

14. The gateway according to claim 13, further comprising:
 a receiver to receive a request from the second field bus for the first time slot for transmitting time-sensitive data from the first subscriber device of the first field bus to the second subscriber device of the second field bus;
 a transmitter to forward the request to the first field bus;
 a receiver to receive a confirmation message from the first field bus; and
 a transmitter to forward the confirmation message to the second field bus.

15. The gateway according to claim 14, wherein the received request comprises a time indication of at least one point in time and/or at least one time interval, the time indication relating to the second time domain of the second field bus, wherein the gateway determines the time indication from the received request relating to the first time domain of the first field bus taking into account the time offset with regard to the reference time, and wherein the request forwarded to the first field bus comprises the time indication relating to the first time domain of the first field bus.

16. The gateway according to claim 15, wherein the received confirmation message from the first field bus comprises a further time indication of at least one point in time and/or at least one time interval, the further time indication relating to the first time domain of the first field bus, wherein the gateway determines the further time indication from the received request relating to the second time domain of the second field bus taking into account the time offset with regard to the reference time, and wherein the confirmation message forwarded to the second field bus comprises the further time indication relating to the second time domain of the second field bus.

17. The gateway according to claim 14, further comprising:
 the processor determining a time overlap of the first time slot set by the first field bus for communicating the time-sensitive data in the first field bus and the second time slot set in the second field bus for communicating the time-sensitive data in the second field bus;
 a receiver to receive the time-sensitive data from the first subscriber device of the first field bus, the time-sensitive data containing the second subscriber device identifier of the virtual copy of the second subscriber device during the overlapping of the first time slot and the second time slot;
 the processor determining an identifier of the second subscriber device based on the second subscriber device identifier of the virtual copy of the second subscriber device during the overlapping of the first time slot and the second time slot; and
 a forwarder to forward the received time-sensitive data to the second subscriber device during the overlapping of the first time slot and the second time slot.

* * * * *